Figure 1:
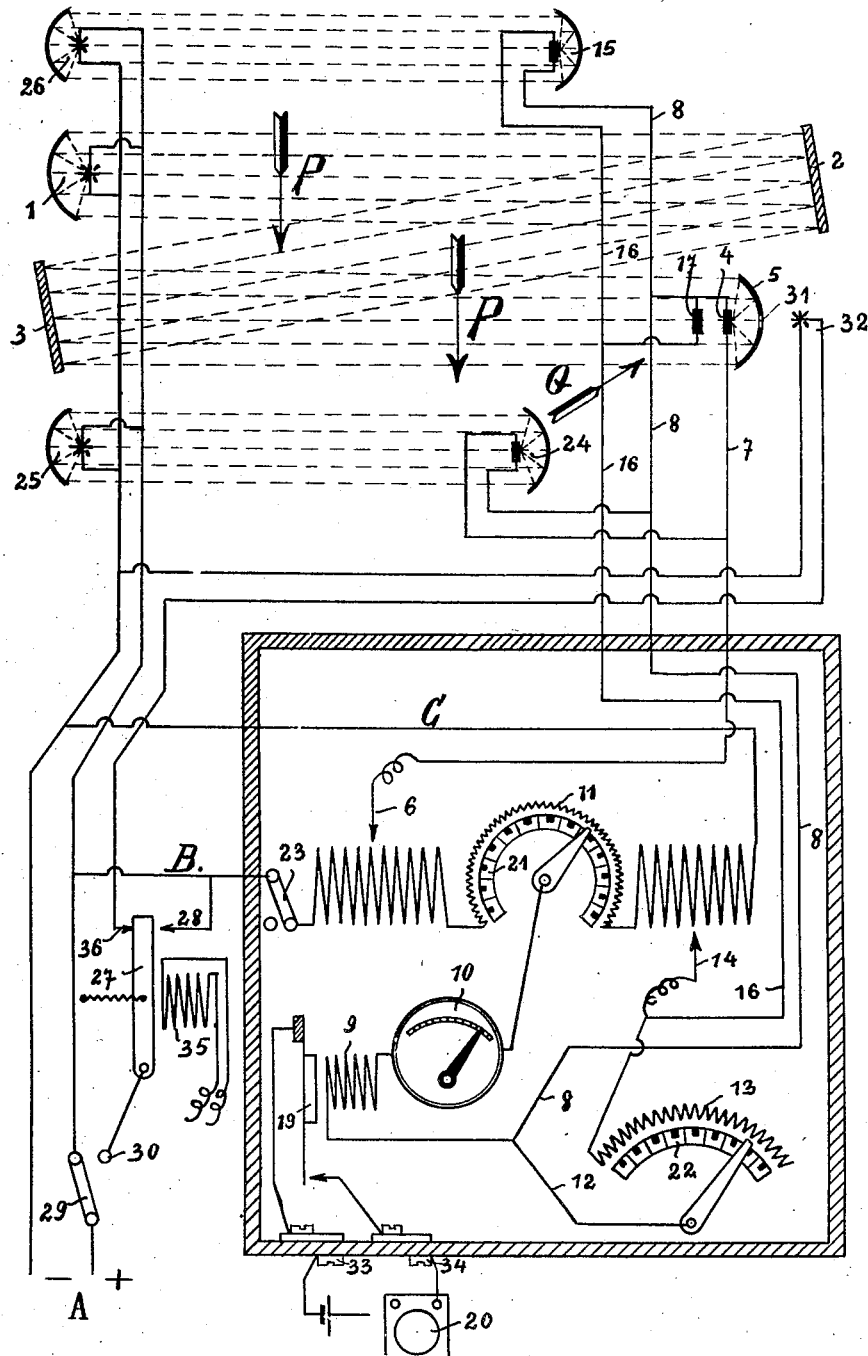

Sept. 10, 1929.  E. H. BOCK  1,727,930

SAFETY DEVICE PROVIDED WITH CELLS WHICH ARE SENSITIVE TO LIGHT

Filed March 13, 1924  2 Sheets-Sheet 1

Inventor
Emil Heinrich Bock,

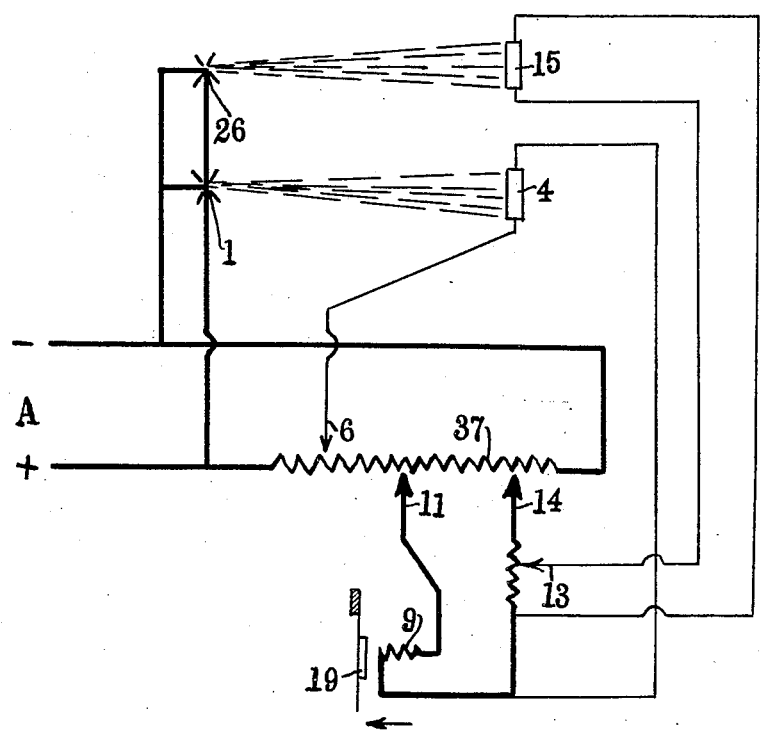

Patented Sept. 10, 1929.

1,727,930

UNITED STATES PATENT OFFICE.

EMIL HEINRICH BOCK, OF HAMBURG, GERMANY.

SAFETY DEVICE PROVIDED WITH CELLS WHICH ARE SENSITIVE TO LIGHT.

Application filed March 13, 1924, Serial No. 699,143, and in Germany August 8, 1922.

The subject of the present invention is a safety alarm device provided with cells sensitive to light, selenium cells or devices operating in a similar manner, which are disposed in an illuminated space and are adapted to be shaded by operations taking place in this space, for example when the space is entered by unauthorized persons, by watchmen, etc. By reason of an increase in the resistance of the cells by reason of the shading, a contact, by means of which alarm or other devices are brought into operation, is operated by means of a relay. It is applicable to burglar alarms, watchmen's recorders and such like mechanisms.

Safety devices employing actinic cells and electric lamps have not been hereto employed generally, partly by reason of the instability of the cells, and partly by reason of the variations in the light of the lamps used to illuminate the cells. Consequently an actinic cell used to operate a relay would operate such relay even when the illumination of the lamp was on the cell, because of a variation of the candle power of the lamp due to current variations at the central station.

The present invention is adapted to eliminate this and other disadvantages which will be hereinafter referred to. It consists principally therein that the circuit of an actinic cell, which cell when shaded is adapted to actuate a relay, has a second circuit opposed thereto through this relay. This second circuit is connected to the source of current of the electric lamp which serves to illuminate the cell, and is provided with devices for counter-acting disadvantageous properties of the actinic cells and their auxiliary illumination.

For the normal illumination of the cells it is therefore necessary according to the invention to use electric lamps. The light is preferably directed upon the sensitive cell by reflectors and the cell may be disposed at the focus or substantially at the focus of a parabolic reflector or of a lens so that the cell receives its illumination principally only from the electric lamps referred to above and any auxiliary illumination of the cells will be considerably exceeded by the main illumination. In spaces where there is no appreciable auxiliary illumination the reflectors or hollow mirrors or both may be omitted. In the accompanying drawing is shown diagrammatically by way of example one form of construction according to the present invention.

Figure 1 is a diagram of an installation, and Fig. 2 a simplified diagram illustrating the principle of operation.

The light of a lamp 1, which is provided with a reflector is directed by mirrors 2 and 3 on to the concave mirror 5 in which the actinic cell 4 is disposed at the focus or substantially at the focus thereof. The source of current for the lamp 1 is indicated at A. To this source of current A is connected a current distributing resistance coil 37 (from + A through the lead B and from − A through the lead C), from which is tapped or branches the circuit for the cell forming an opposing circuit therefor. The circuit for the cell extends from the current distributing resistance coil 37, tapping point 6, lead 7, cell 4, lead 8, relay 9, measuring instrument 10, back to the current distributing coil at the tapping point 11. In this circuit may be included a number of actinic cells which when shaded actuate the relay, for example also the cell 24, which may be arranged in series with the cell 4 or as shown in the drawing arranged in parallel with the cell 4. A lamp 25 serves to illuminate the cell 24. To this cell circuit is provided an opposing circuit extending from the tapping point 11 of the current distributing resistance coil 37, through the measuring instrument 10, relay 9, lead 12, adjustable resistance 13, and back to the current distributing coil at the tapping point 14. As according to the invention the opposing circuit must be connected to the current source for the light, this is not absolutely essential for the circuit of the cell, but only when the circuit of the cell should act as an opposing circuit for a second sensitive cell, the second cell being adapted to operate the contact when shaded (cell 15 included in the circuit 11, 10, 9, 8, 15, 16, 14). The sensitive cells 4, 15 and 24, which are arranged to produce a contact movement in the relay when shaded, will be referred to in the following specification and in the claims as shaded cells so as to differentiate them from the cell 17 disposed adjacent the cell 4, the cell 17 being adapted in the case of brighter illumination to effect the operation of a contact as will be described hereinafter.

The following specification firstly refers to a single shaded cell circuit of the sensitive cell 4 without the provision of a second shading cell 15 in the opposing circuit. When in the case of an electric incandescent lamp, of well known construction, the connections and circuits are in order, appreciable light fluctuations of an electric lamp can only be caused by fluctuations of current in the current source for the lamp. These current fluctuations will then also act upon the opposing circuit 11, 10, 9, 12, 13, 14, connected to the current source A and acting on the relay, these current fluctuations being in relation to every fluctuation of the illumination of the cell 4 in so far as these are not produced by auxiliary illumination. If the cell 4 is darkened, for example by traversing the light rays in the direction of the arrow P then in consequence of the increase in resistance of the cell 4 the passage of current is reduced in the circuit thereof and the current in the opposing circuit 11, 10, 9, 12, 13, 14 over-balances the current of the shaded cell circuit 6, 7, 4, 8, 9, 10, 11, to such an extent that the relay 9 attracts its armature 19 and actuates an alarm bell 20 or any other suitable device. If however the shaded cell 4 becomes darkened because the lamp 1 is temporarily less bright, which may be due to a temporary reduction of the voltage at the supply point A, then at the same time there is a reduction in current in the circuit 11, 10, 9, 12, 13, 14, also connected to the source of supply A, which prevents the required amount of current for operating the relay.

For the purpose of adjusting the proportions of strength of the currents acting in opposite directions in the relay an adjusting lever is provided at the tapping point 11 or an adjustable resistance 13 is used. The adjusting devices 11 or 13 are provided respectively with scales 21 and 22, from which the position of the adjusting lever can be read off in figures. The adjusting devices 11 or 13, after setting the apparatus, is adjusted so that there will be an excess current passing through the circuit 11, 10, 9, 12, 13, 14 so that the relay 9 will attract its armature 19 thus ringing the bell 20. By opening the switch 23 the passage of current through the relay is interrupted and the lever of the adjustable resistance 13 or the lever at the tapping point 11 is turned back through a desired number of scale divisions on its respective scale 22 or 21. In this manner a degree of sensitiveness, which can be read off from the scale, is adjusted at which the apparatus will operate the contact when the cell 4 is illuminated. The switch 23 is then again closed.

With the arrangement as above described it is possible for an unauthorized person to increase the passage of current through the circuit of the shading cell 4 by placing a powerful second lamp in front of this cell so that when crossing the normal illumination the contact would not be released. In order to prevent this occurring a second cell 17 sensitive to light is so arranged adjacent the shading cell 4 that if a second lamp is held in front of the cell 4 the cell 17 will also be illuminated by the second lamp. The cell 17 is, as illustrated in the drawing, arranged in parallel with the resistance 13 in the opposing-circuit to the circuit of the shaded cell and is for example included in the circuit 11, 10, 9, 8, 17, 16, 14. If therefore it is more strongly illuminated it will increase the current excess in this circuit to such an extent that the relay 9 will be caused to attract its armature 19. In this case a strong illumination of the cell 17, for example by sunlight in the morning, must be avoided by placing the cell casing in a suitable position or suitably covering it from the direct sunlight.

The shaded cell 4 has its sensitive layer turned towards the interior of the concave mirror 5 and consequently receives the light reflected by the mirror 3 on to the concave mirror 5 in a concentrated form. The cell 17 however has its sensitive layer directed away from the concave mirror 5 and turned directly towards the mirror 3 so that the cell 17 only receives the reflected light in a simple form from the mirror 3. Consequently a shading due to a passage in the direction of the arrow P through the rays of light will increase the resistance of the cell 4 which is normally more strongly lighted, than the resistance of the cell 17 which is only simply illuminated, so that when both cells are shaded there will be a greater reduction of the current in the circuit of the cell 4 than in the circuit of the cell 17. There will consequently be formed a sufficiently strong excess of current in the circuit of the cell 17 in combination with the parallel circuit 11, 10, 9, 12, 13, 14 in order to cause the relay 9 to attract its armature 19. If on the other hand the cells 4 and 17 are more strongly illuminated, for example by means of a second lamp held in front of these cells by an unauthorized person, the cell 4 can only be substantially more illuminated when the rays of the second lamp fall directly in the direction from mirror 3 to reflector 5. In such a case there would first of all be an interruption of the regular rays of light by the body of the second lamp and a contact release would have occurred. A light thrown on the cells at an angle, for example in the direction of the arrow Q, will impact upon the cell 17 to such an extent that the contact movement in the relay is released, as the sensitive layer of the cell 4 is directed towards the interior of the reflector 5, whereas the sensitive layer of the cell 17 is directed outwardly.

In order to reduce the expense of lighting and for protecting the sensitive cells, which are liable to be deleteriously affected by a continual passage of current therethrough, it is advisable periodically to disconnect the apparatus. In the drawing a switch 27 is provided which is periodically brought into contact with the contact 28 by means of a magnet coil 35. When the armature 27 engages with the contact 28 the apparatus is in the operative position, the switch 29 having been previously brought into contact with 30 so as to change the apparatus from continuous operation to alternate operation. Now with such an arrangement for alternate operation the cell 4 before switching in the apparatus would have been shaded for a certain period of time so that the resistance thereof will have considerably increased in the meantime. In consequence of the slow action of many cells (for example a selenium cell), then at the moment when switching in the apparatus the current flowing through the cell 4 would be different to the normal passage of current so that a contact movement is liable to be produced in the relay. In order to avoid this the concave mirror 5, in the focus or substantially at the focus of which the sensitive cell 4 is disposed, is provided with an aperature or opening 31, which can be formed by removing or omitting the mirror coating of a glass concave mirror at this point, behind which opening is disposed a small lamp 32. This lamp then illuminates the sensitive layer of the cell 4 if the lamp is extinguished by reason of the fact that the switch armature 21 bears against the contact 36. The circuit of the lamp 32 extends from plus A through 30, 27, 36, 32 back to minus A. As the lamp 32 is placed close to the cell 4 its weak light suffices for producing the same illuminating strength of the cell 4 as is obtained by the distant powerful one when in circuit so that by the periodic switching off of the lamp 1 and the simultaneous switching in of the lamp 32 a considerable saving in light may be effected without varying the illuminating strength of the cell 4 and without any appreciable variation of the current from the normal current strength. The lamp 32 arranged near the cell 4 may also, according to the construction of the cell casing, illuminate the cell 4 from another position if it is not desired to provide an opening or transparent portion in the concave mirror or when a concave mirror is not used.

If it is desired to have in the opposing-circuit a further sensitive cell which when shadded is adapted to actuate the relay (cell 15 with illuminating lamp 26) this may either be arranged in parallel with the adjustable resistance 13, as indicated in the drawing by means of the circuit 11, 10, 9, 8, 15, 16, 14. If the electromagnetic relay 9 is omitted then the rotary relay 10 must be suitably modified. The two lamps 1 and 26 are connected to the same source of current A. Consequently any fluctuations in the light take place simultaneously in both lamps so that in consequence of the light fluctuations of these lamps both cells will be affected simultaneously and their variation in resistance will thus be capable of being balanced by the opposing-current.

However the normal strength of illumination of the two cells will not as a rule be the same as when the cells are placed at different distances from their lamps so that in the case of the sudden reduction of the light of the lamps the increase in resistance of one cell may be considerably smaller or larger than that of the other. This may also be the case even when the two lamps are of the same illuminating strength if the two cells act differently internally (for example two selenium cells). One of the cells with the same amount of shading may have a greater variation in resistance than the other and the different slowness of action of the two cells will also cause the variation of the resistance of one cell to take place more rapidly or slower than in the other so that interruptions in working are liable to be caused thereby. This is again avoided by connecting the two relatively disposed circuits of the shading cells to the source of current for the lamps and by the accurate adjustment of the relative magnitude of the two opposing currents. For this purpose the measuring instrument 10, which is in the form of a rotary coil relay, is provided with a sufficiently large pointer movement and the tapping point 11 on the current distributing coil is in the form of a fine adjusting device. In this manner it is possible to adjust and accurately limit a differential current, which is periodically necessary in one direction or the other, which balances the different slowness of action and the different action of two shading cells opposing one another in the case of fluctuations in the light.

The function of the apparatus is obtained by the release of a contact in the relay by shading one or more sensitive cells. The type of apparatus which are adapted to be actuated by the contact release and their connection to the apparatus, for example to the terminals 33 and 34, do not form part of the present invention. These may be alarms for burglary and theft, signal and indicating devices, or devices which are used for supervising or controlling a factory and which are adapted to be influenced when a sensitive cell is shaded.

The object of my invention is that notwithstanding the variations of the illumination of the cell, as caused by the variations of its lamp (temporary reduction of the intensity of the light of this lamp) such variation shall not effect the contact relay, whereas the variations of the illumination of the cell by shadowing (crossing of its illumination rays, for instance by a thief) shall affect said relay.

The basic consideration is that variations of the light of an electric lamp are caused solely by variations of the voltage of the source of the current, and to render these variations ineffective, a Wheatstone bridge or other counter-current connection is provided in which that circuit which is located counter to the selenium cells circuit through the relay is connected up to the same circuit that feeds the lamp. This system is, however, not ineffective but fulfills its purpose as will be explained and proved hereinafter.

It should be noted that a change of the resistance of the cell as caused by shadowing affects the relay and causes it to operate, whereas the same change when caused by the lamp burning less brightly does not affect the relay and does not cause it to operate.

In the numerical example dealt with in the following lines the condition is taken that the reduction of the passage of the current through the cell circuit, due to shadowing of the cell, amounts to 1 milli-ampere, and that by this reduction the contact in the relay is to be closed. The plant may then be so adjusted that in the normal service condition of the cell when it is not shadowed a continual current of about 3 milli-amperes is flowing through the relay, and this latter can be so adjusted that it produces a contact if the current flowing through it rises to 4 milli-amperes. The continual current passage of 3 milli-amperes is brought about by adjusting appropriately the current tapping point 11 of the current distributing coil, and by adjusting appropriately an adjustable resistance 13, the arrangement being such that in the counter current circuit (11—9—13—14 of the simplified drawing, Fig. 2) there is a current of 5 milli-amperes, and in the cell circuit (6—4—9—11 Fig. 2) a current passage of 2 milli-amperes exist. The difference $5-2=3$ milli-amperes is active in the relay. In normal service the difference cannot actuate the relay, as that can take place only at 4 milli-amperes. But as soon as the current passage becomes diminished, by shadowing of the selenium cell, from 2 milli-amperes to 1, the difference of current in the relay is $5-1=4$, and now a contact takes place in the relay.

Matters are different when the resistance of the selenium cell is increased by the lamp burning darker, and the current passage through the selenium circuit has become reduced by 1 milli-ampere from this cause. In this case the relay cannot produce a contact because the reduction of the intensity of the light of the lamp has been caused by a reduction of the voltage in the source of the lamp current, and as that circuit which is connected counter to the cell circuit is also connected to the same source of current, a diminution of the current passage has taken place also in the cell counter-current circuit. Even if the assumption were made that by a temporary fall of voltage of say 30% the lamp be so much darkened that the resistance of the selenium cell rises by 100%, still the relay cannot respond thereto as the following phenomenon has occurred:

Owing to the increase of resistance by 100% in the cell circuit (more precisely about from 80 to 90%, because the resistances of the current distributing coil and of the relay have remained the same as before) it is true the current passage through the cell circuit has fallen from 2 milli-amperes to 1, nevertheless the current passage through the counter circuit has fallen by 30%, that is to say, from 5 to 3.5 milliamperes, and the relay cannot be operated by the current then flowing through it, this current amounting to $3.5-1=2.5$ milli-amperes.

According to the drawing also the cell circuit is for the sake of simplicity, connected up to the source of current of the lamp. (This can, under circumstances, be dispensed with, especially if instead of the Wheatstone-bridge connection employed in the drawing another type of counter-current connection is made use of.) According to the example shown in the drawing, the current passage through the cell circuit will have been reduced, (besides by reason of the increase of resistance of the selenium cell, also by the fall of voltage), by further 30%, and the resultant current passage must be corrected accordingly, viz: $3.5-0.7=2.8$ milli-amperes, which is also still insufficient to actuate the relay.

This numercial example is to show the efficaciousness of the system in outlines; as a matter of course the details vary according to the type of the selenium cell, the source of current and of the lamp, the distance between the lamp and the selenium cell and the like, and they must be chosen according to the individual conditions to be dealt with. At any rate, the example clearly shows that the increase of the resistance of the selenium cell by shadowing will give rise to an alarm, whereas the increase of the resistance of the cell as caused by the lamp burning less brightly will not cause an alarm. If the system of connecting up the counter current circuit to the source of current feeding the lamp were not used, every temporary darkening of the lamp would produce a so-called false alarm.

With plants having only one selenium cell a current is flowing, according to the above numerical example, always through the relay if the plant is in normal service condition, even if the relay is located between the legs of a Wheatstone bridge (that current being the result of the difference of two currents tending to flow through the relay in opposite directions.

Having thus described my invention what I claim as new and desire to secure by Letters Patent is:—

1. In an electric safety device, in combination, an electric lamp, a supply circuit therefor, a branch circuit, a photo-electric cell in the branch circuit spaced far apart from the lamp and positioned to be illuminated thereby, an electro-magnet, means connecting the electro-magnet with the supply circuit to produce a current flow therethrough in a given direction, means connecting the branch circuit with the electro-magnet to produce a current flow in the opposite direction, a signal, and means controlled by the electro-magnet when the differential current therethrough reaches a given value, for operating the signal.

2. In an electric safety device, in combination, two electric lamps, a supply circuit therefor, a branch circuit, a photo-electric cell in the branch circuit spaced far apart from one of the lamps and positioned to be illuminated thereby, an electro-magnet, means connecting the electro-magnet with the supply circuit to produce a current flow therethrough in a given direction, means connecting the branch circuit with the electro-magnet to produce a current in the opposite direction, a second branch circuit, a second photo-electric cell therein spaced far apart from the other lamp and positioned to be illuminated thereby and controlling the current through the first branch circuit, a signal, and means controlled by the electro-magnet when the differential current therethrough reaches a given value, for operating the signal.

In testimony whereof I have signed my name to this specification.

EMIL HEINRICH BOCK.